United States Patent [19]

Ruyten et al.

[11] 4,258,556
[45] Mar. 31, 1981

[54] TORSION SPRING CLUTCH

[75] Inventors: Henricus M. Ruyten, Eindhoven, Netherlands; Johann Veigl, Vienna, Austria

[73] Assignee: U.S. Philips Corporation, New York, N.Y.

[21] Appl. No.: 956,310

[22] Filed: Oct. 31, 1978

[30] Foreign Application Priority Data

Nov. 10, 1977 [AT] Austria ................................. 8026/77

[51] Int. Cl.³ .......................... F16D 7/02; F16D 13/08
[52] U.S. Cl. ................................. 64/30 E; 192/56 C; 192/110 R
[58] Field of Search .......... 64/30 E; 192/56 C, 110 R

[56] References Cited

U.S. PATENT DOCUMENTS

| 1,126,780 | 2/1915 | Jones | 192/56 C |
| 3,956,905 | 5/1976 | Thackston | 64/30 E |

Primary Examiner—Allan D. Herrmann
Attorney, Agent, or Firm—David R. Treacy

[57] ABSTRACT

A torsion spring clutch having coaxial clutch sections rotatable relative to each other, connected by a helical torsion spring which frictionally engages a conical portion of one of the clutch sections. A mounting portion is rotatable with respect to guide surfaces on one of the clutch sections to produce axial movement of the mounting section and spring for adjustment of the clutch force.

4 Claims, 2 Drawing Figures

TORSION SPRING CLUTCH

BACKGROUND OF THE INVENTION

The invention relates to a torsion spring clutch, in particular for recording and/or playback equipment, comprising two clutch sections, which are coaxial with and rotatable relative to each other, and a helical torsion spring, which is slid onto the two clutch sections for the transmission of force between said sections. Such a torsion spring clutch is for example known from U.S. Pat. No. 3,085,758.

In such a torsion spring clutch the first clutch sections is rigidly connected to the torsion spring and the second clutch section is in frictional engagement with the torsion spring, whose turns have been slid onto said clutch section with a specific pretension. The pretension in the turns of the torsion spring is obtained by selecting the diameters of the torsion spring and the clutch section so that the turns of the torsion spring are widened when the spring is slid onto the clutch section, the resulting increase in diameter of the individual turns of the torsion spring determining the pretension in these turns. If during operation of the torsion spring clutch its direction of rotation is selected so as to oppose the winding direction of the helically wound torsion spring, the torsion spring is tightened onto second the clutch section which it frictionally engages, which results in a substantially rigid coupling between the two clutch sections via the torsion spring. However, if the direction of rotation of the torsion spring clutch corresponds to the winding direction of the torsion spring, a torque which is proportional to the maximum value of the pretension can be transmitted between the torsion spring and the second clutch section. When the maximum torque that can be transmitted between the torsion spring and the second clutch section is exceeded, slip occurs, the drive connection between the clutch sections then being disengaged. When such torsion spring clutches are used it is frequently required to adjust the value of the maximum torque that can be transmitted. This is for example the case when the torsion spring clutch serves for driving a winding hub or a drive wheel in recording and/or playback apparatus.

SUMMARY OF THE INVENTION

It is the object of the invention to construct a torsion spring clutch of the type mentioned in the preamble in such a way that the value of the maximum torque that can be transmitted is adjustable and can thus be adapted to different constructional situations and requirements.

Such a torsion spring clutch is characterized in that the second clutch section has a portion which widens conically in the direction away from the other clutch section, with which portion the torsion spring co-operates frictionally, and that, for changing the force transmitted between the clutch sections, the torsion spring and the second clutch section are arranged so as to be axially adjustable relative to each other, thus changing the number of turns of the torsion spring slid onto the conically widening portion. In the case of an axial displacement of the torsion spring and the conically widening portion relative to each other, the number of the turns slid onto said portion changes, while the turns which have been slid on under pretension are further widenend or contracted depending on the direction of the axial displacement, so that in this way the pretension with which the turns engage with the conically widening portion changes. As the pretension, which is thus variable, is a measure of the maximum torque that can be transmitted by the torsion spring clutch, this torque can be adjusted in a simple manner. Thus, a torsion spring clutch can for example be adjusted for the transmission of different torques or tolerances in the mass-production of such torsion spring clutches can be compensated for, so that all clutches can be adjusted so as to transmit the same torque.

The torsion spring may then be cylindrical, while different pretensions prevail in the torsion spring turns which engage with the conically widening portion, because each of these turns is widened to a different extent. However, it is found to be particularly advantageous if the torsion spring widens conically in a direction away from the other clutch section. Thus, it is achieved that the pretension in all turns which engage with the conically widening portion has essentially the same value, because these turns are essentially widened to the same extent, so that a uniform force distribution between the torsion spring and the clutch section is obtained.

For adjusting the clutch it is also possible to arrange one or both clutch sections so as to be axially adjustable, but this results in a comparatively intricate construction. In this respect it is found to be advantageous if the first clutch section is rigidly connected to a mounting section for the torsion spring, which mounting section is arranged to be axially adjustable relative to the first clutch section. Thus, the clutch sections can suitably be arranged so as to be axially stationary and the axial adjustment of the torsion spring relative to the conically widening portion of the one clutch section is obtained by an axial adjustment of the mounting section provided on the other clutch section, against which mounting section the torsion spring bears. In this respect it is found to be particularly advantageous if the rigid connection between the first clutch section and the mounting section is detachable and the mounting section and the other clutch section are arranged so as to be rotatable relative to each other, and between these two sections there is provided at least one guide for adjusting the supporting section in the axial direction. Thus, a particularly reliable and accurate adjustment of the clutch is obtained. The rigid detachable connection between the other clutch section and the mounting section may for example be realized by a screw connection. Alternatively it is found to be advantageous if the rigid detachable connection between the other clutch section and the mounting section is constituted by a latching device comprising a plurality of latching points and acting between said sections. Thus, the rigid connection can be released simply and quickly without special aids in an advantageous manner.

BRIEF DESCRIPTION OF THE DRAWINGS

The invention will now be described in more detail with reference to the drawing, which shows an embodiment to which the invention is not limited.

DESCRIPTION OF THE PREFERRED EMBODIMENTS

Figure 1:
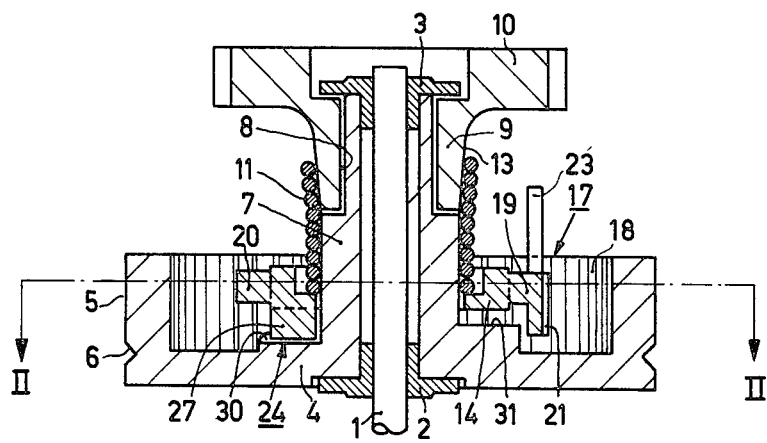
FIG. 1 is an axial cross-section of a torsion spring clutch taken on the line I—I in FIG. 2, whose driven coupling section comprises a conically widening portion.
Figure 2:
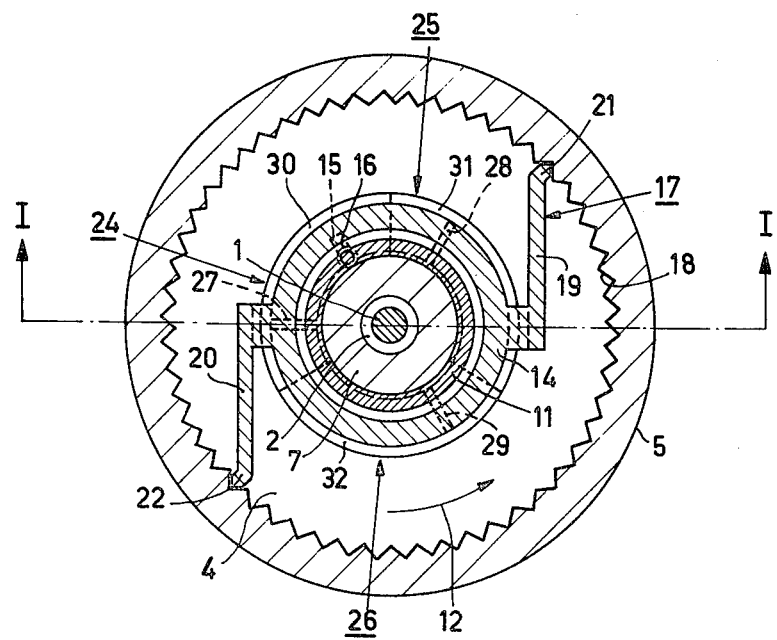
FIG. 2 is a cross-section through the torsion spring clutch in accordance with the line II—II in FIG. 1.

FIGS. 1 and 2 show a torsion spring clutch, which comprises a shaft 1, on which two bearing bushings 2 and 3 are mounted for journalling a first clutch section 4, which is thus connected to the shaft 1. The first clutch section 4, which in the present embodiment serves as the driving clutch section, is constituted by a cup-shaped member or pulley which at its circumference 5 has a groove 6 for engagement with a drive belt and whose cylindrical hub portion 7 is disposed between the two bearing bushings 2 and 3. The cylindrical hub portion 7 has a recessed portion 8, in which the hub 9 of a second coupling section 10 is mounted so as to be rotatable, the bearing bushing 3 retaining the hub 9 in the recessed portion 8. The coupling section 10, which in the present example serves as the driven coupling section, takes the form of a gear wheel.

The two coupling sections 4 and 10 are coaxial and rotatable relative to each other as described hereinbefore. For the transmission of force between the two clutch sections 4 and 10 a helical torsion spring 11 is slid onto the two sections, which spring in the present embodiment is wound in the direction of the arrow 12. The torsion spring 11 is rigidly connected to the driving clutch section 4 and is in frictional engagement with the driven clutch section 10. The turns of the torsion spring 11 are slid onto the two clutch sections 4 and 10 under pretension. The pretension in the turns of the torsion spring 11 is obtained by selecting the diameters of the torsion spring and the clutch section so that the turns of the torsion spring are widened when it is slid onto the clutch sections. The resulting increase in diameter of the turns of the torsion spring determines the pretension in said turns.

When the driving clutch section 4 is driven in the direction of the arrow 12, the torsion spring 11, which is rigidly connected to that section, is also rotated in the direction of the arrow 12, i.e. in the winding direction of the helically wound torsion spring. The torsion spring 11, which is in frictional engagement with the driven clutch section 10, then drives that section, the maximum torque that can be transmitted being dependent on the pretension which the turns of the torsion spring 11 engage with the driven clutch section 10. It is evident that as the pretension increases, the maximum torque that can be transmitted also increases, because the turns of the torsion spring then engage with the driven clutch section with greater force.

Of the two clutch sections 4 and 10 the second clutch section 10 in the present embodiment comprises a portion 13 which conically widens in the direction away from the clutch section 4, which portion frictionally engages with the torsion spring 11. The torsion spring 11 also widens conically in the direction away from the driving clutch section 4. In order to change the force transmitted between the clutch sections 4 and 10, the torsion spring 11 and the clutch section 10 with the conical portion 13 are arranged to be axially adjustable. By adjusting the torsion spring 11 and the clutch section 10 relative to each other, the number of torsion spring turns slid onto the conical portion 13 changes, so that the pretension in these turns also changes and thus, as previously stated, the maximum torque that can be transmitted.

As can be seen in FIGS. 1 and 2, the driving clutch section 4 is rigidly connected to a mounting section 14 for the torsion spring 11, which mounting section is axially adjustable relative to the driving clutch section, while the mounting section 14 is slid onto the cylindrical hub portion 7 of the clutch section 4 and is journalled thereby. The torsion spring 11 bears against the mounting section 14. A hook-shaped end 15 of the spring is passed through a bore 16 of the mounting section with its hook-shaped end 15. In this way a rigid connection is formed between the torsion spring and the mounting section 14 or the driving clutch section 4 which is rigidly connected thereto.

The rigid connection between the clutch section 4 and the mounting section 14 is obtained by means of a latching device 17 comprising a plurality of latching points and acting between these sections. The latching device 17 consists of a multiplicity of teeth 18 on the inner wall of the clutch section 4, which section takes the form of a cup-shaped pulley, and of two equally spaced resilient latching arms 19 and 20 formed on the mounting section 14, which engage with the teeth 18 with their free ends 21 and 22 and thus establish the rigid connection between the clutch section 4 and the mounting section 14. By adjusting the resilient latching arms 19 and 20, by radially pressing the projections on the two latching arms, of which FIG. 1 shows the projection 23, towards each other, the free ends 21 and 22 of the latching arms 19 and 20 are disengaged from the teeth 18, so that the rigid connection between the clutch section 4 and the mounting section 14 can be released easily and simply.

The clutch section 4 and the mounting section 14, which are connected to each other by means of this detachable rigid connection, are arranged so as to be rotatable relative to each other, the mounting section 14 being journalled by the cylindrical hub portion 7 of the clutch section 4. Between the clutch section 4 and the mounting section 14 three sets of cooperating guide surfaces 24, 25 and 26 are provided for adjusting the mounting section 14 in the axial direction, which equally spaced guides each consist of respectively a projection 27, 28 and 29 formed on the mounting section 14 and a contact helical ramp face 30, 31 and 32, on the clutch section 4 which is inclined relative to the axial direction and co-operates with the corresponding projection. When the mounting section 14 is rotated relative to the clutch section 4, which obviously is possible only after releasing the rigid connection constituted by the latching device 17, the projections 27, 28 and 29 slide over the contact faces 30, 31 and 32, which are inclined relative to axial direction, so that the mounting section is axially adjusted in accordance with the slope of the contact faces. By adjusting the mounting section in the axial direction, the torsion spring 11 is also adjusted in the axial direction, so that the maximum torque that can be transmitted is adjustable. For this the latching device 17 is released first. This is effected by moving the projections 23 formed on the resilient latching arms 19 and 20 towards each other in the radial direction. After the free ends 21 and 22 have been disengaged from the teething 18, the mounting section 14 can be rotated relative to the clutch section 4, for example in a clockwise direction, i.e. against the direction of the arrow 12. During this rotation the projections 27, 28 and 29 formed on the mounting section 14 slide over the contact faces 30, 31 and 32, so that because of the slope of the contact faces and the direction in which the mounting section 14 is rotated, this section is axially moved towards the driven clutch section 10. Obviously, the torsion spring 11, which bears against the mounting section, is then also moved in the axial direction towards the clutch section 10, the number of torsion spring turns slid on the conically widening portion then being increased. As a result of this, the turns slid onto the conically widening portion are widened, so that the pretension with which said turns engage with this portion increases. However, since as previously stated, this pretension in the turns of the torsion spring is a measure of the maximum torque that can be transmitted, an increase of that torque is thus achieved. Through the conical shape of the torsion spring it is then achieved that the increase in diameter in all turns which engage with the conical portion is essentially the same, so that the pretension in said turns is also substantially the same. Thus, a uniform force distribution is achieved between the torsion spring and the clutch section with which it cooperates.

If the mounting section 14 is rotated in the direction opposite to that mentioned in the foregoing, i.e. in the direction of the arrow 12, said section is moved away from the driven clutch section in the axial direction. The torsion spring 11, which is attached to the mounting section 14, is then also moved in this direction, the number of turns slid onto the conical portion of the driven clutch section 10 then being reduced. The turns slid on the conical portion then contract, so that the pretension in these turns and thus the maximum torque that can be transmitted decreases.

As is evident from the foregoing embodiments, this construction provides a torsion spring clutch, in which the maximum torque that can be transmitted is adjustable in a particularly simple manner, while a reliable and accurate adjustment is possible. Such a torsion spring clutch is particularly suitable for driving winding spindles and drive wheels in recording and/or playback equipment.

It will be clear to those of ordinary skill that the invention is not limited to the embodiments described. As an example, the driving clutch section may comprise the conical portion which widens in the direction away from the driven clutch section, the torsion spring then being rigidly connected to the driven clutch section. For the axial adjustment of the torsion spring relative to the conically widening portion, it is also possible to arrange one or both clutch sections so as to be axially adjustable. Further, the torsion spring may also be cylindrical.

I claim:

1. A torsion spring clutch comprising:

first and second clutch sections arranged coaxially with and rotatable relative to each other, the second of said sections having a conical portion which widens in the direction away from the first section, a helical torsion spring slid over said clutch sections, including said conical portion, for transmitting force therebetween, and means for axially adjusting the position of the spring relative to the second section so as to change the maximum force transmitted between the two sections, characterized in that said means comprise a mounting section for the torsion spring, and detachable means for rigidly connecting said mounting section to the first section, said mounting section being rotatable relative to the first section upon detaching of the connecting means, said mounting section and said first section having cooperating guide surfaces for relative axial movement of the mounting section with respect to the first section upon rotation of the mounting section relative to the first section.

2. A clutch as claimed in claim 1, wherein said detachable means comprise a latching device acting between the mounting section and the first section, having a plurality of latching points.

3. A clutch as claimed in claim 1, wherein said first section includes a cup-shaped member having a multiplicity of internal teeth, said detachable means including a plurality of equally spaced arms extending from the mounting section and engaging respective teeth.

4. A clutch as claimed in claim 1, 2 or 3 wherein said cooperating guide surfaces comprise at least three equally spaced ramp faces extending helically about the axes of the first and second sections, and an equal number of equally spaced projections arranged to engage said faces.

* * * * *